(12) United States Patent
Chang et al.

(10) Patent No.: US 9,385,542 B2
(45) Date of Patent: Jul. 5, 2016

(54) SERIAL MULTI-BATTERY CHARGER WITH INDEPENDENT SIMULTANEOUS CHARGE AND DISCHARGE

(71) Applicant: Hong Kong Applied Science & Technology Research Institute Company Limited, Hong Kong (HK)

(72) Inventors: Po Wah Chang, Hong Kong (HK); Chi Chiu Tsang, Hong Kong (HK); Chik Wai (David) Ng, Hong Kong (HK); Yuanzhe Xu, Hong Kong (HK); Wai Kei Or, Hong Kong (HK); Kwok Kuen (David) Kwong, Davis, CA (US)

(73) Assignee: Hong Kong Applied Science and Technology Research Institute Company, Limited, Hong Kong (HK)

( * ) Notice: Subject to any disclaimer, the term of this patent is extended or adjusted under 35 U.S.C. 154(b) by 162 days.

(21) Appl. No.: 14/315,611

(22) Filed: Jun. 26, 2014

(65) Prior Publication Data

US 2015/0380959 A1 Dec. 31, 2015

(51) Int. Cl.
*H02J 7/00* (2006.01)
*H01M 6/50* (2006.01)
*H01M 10/46* (2006.01)
*H01M 10/42* (2006.01)
*H01M 10/44* (2006.01)

(52) U.S. Cl.
CPC .............. *H02J 7/0019* (2013.01); *H02J 7/0016* (2013.01); *H02J 7/0021* (2013.01); *H02J 7/0026* (2013.01); *H02J 7/0031* (2013.01); *H02J 7/0045* (2013.01); *H02J 7/0068* (2013.01); *H01M 10/425* (2013.01); *H01M 10/441* (2013.01); *H01M 10/465* (2013.01); *Y02T 90/124* (2013.01); *Y10T 307/625* (2015.04); *Y10T 307/653* (2015.04)

(58) Field of Classification Search
CPC ..... H02J 7/0016; H02J 7/0019; H02J 7/0021; H02J 7/0026; H02J 7/0068; H02J 7/0045; H02J 7/0031; H01M 10/425; H01M 10/441; H01M 10/465; Y10T 307/653; Y10T 307/625; G06F 1/263; Y02T 90/124
See application file for complete search history.

(56) References Cited

U.S. PATENT DOCUMENTS 4,061,956 A * 12/1977 Brown ................... H02J 7/0091
320/146
5,175,484 A * 12/1992 Witehira ................... H02J 1/14
307/10.6

(Continued)

*Primary Examiner* — Helen Rossoshek
(74) *Attorney, Agent, or Firm* — Stuart T. Auvinen; gPatent LLC

(57) ABSTRACT

A serial battery charger has a battery matrix with switches that are configured by a microcontroller that reads voltages between batteries to determine if each battery is fully-charged, charging, or absent. A switch configuration allows charging and discharging currents to flow simultaneously, and allows discharging current but blocks charging current from fully-charged batteries to prevent over-charging. The charging current flows through all charging batteries in series while the discharging current flows from all fully-charged and charging batteries in series. Blocking and bypass switches route the charging current to all charging batteries in series, but bypass all fully-charged and absent batteries. The blocking and bypass switches route the discharging current serially through all fully-charged and charging batteries in the battery matrix while avoiding absent batteries. The switches are controlled by the switch configuration from the microcontroller. Larger battery matrixes have row and column lines that are connected by connecting switches.

12 Claims, 16 Drawing Sheets

(56) References Cited

U.S. PATENT DOCUMENTS

| | | | | |
|---|---|---|---|---|
| 5,666,006 A * | 9/1997 | Townsley | H02J 7/0024 | 307/43 |
| 5,680,027 A * | 10/1997 | Hiratsuka | G01R 31/3624 | 307/150 |
| 5,747,966 A | 5/1998 | Minamoto | | |
| 6,614,233 B2 * | 9/2003 | Sugimoto | G01R 31/3658 | 324/434 |
| 6,822,423 B2 * | 11/2004 | Yau | H02J 7/0018 | 320/122 |
| 7,208,917 B2 | 4/2007 | Yang | | |
| 7,557,538 B2 | 7/2009 | Yau et al. | | |
| 7,586,473 B2 * | 9/2009 | Edwards | G09G 3/3614 | 345/204 |
| 7,609,031 B2 * | 10/2009 | Benckenstein | H02J 7/0016 | 307/66 |
| 7,834,583 B2 * | 11/2010 | Elder | B60L 3/0046 | 307/10.7 |
| 7,969,121 B2 * | 6/2011 | Smith | H02M 3/1584 | 320/167 |
| 8,008,890 B2 * | 8/2011 | Lee | H02J 7/0018 | 320/118 |
| 8,643,325 B2 | 2/2014 | Yang | | |
| 9,005,230 B2 * | 4/2015 | Yates | A61B 17/068 | 606/180 |
| 2004/0196007 A1 * | 10/2004 | Iwashima | H02J 7/0021 | 320/134 |
| 2005/0024014 A1 | 2/2005 | Shum | | |
| 2005/0035741 A1 * | 2/2005 | Elder | B60L 3/0046 | 320/116 |
| 2005/0208344 A1 * | 9/2005 | Tan | G06F 1/263 | 429/7 |
| 2007/0075684 A1 | 4/2007 | Liu et al. | | |
| 2007/0090788 A1 * | 4/2007 | Hansford | H01M 2/1055 | 320/107 |
| 2009/0201620 A1 * | 8/2009 | Gray | B60L 11/00 | 361/159 |
| 2009/0284022 A1 * | 11/2009 | Usselman | F02D 29/06 | 290/38 R |
| 2009/0289599 A1 * | 11/2009 | White | H02J 7/0016 | 320/120 |
| 2010/0007308 A1 * | 1/2010 | Lee | H02J 7/0018 | 320/118 |
| 2010/0141206 A1 * | 6/2010 | Agassi | B60K 1/04 | 320/109 |
| 2011/0210701 A1 * | 9/2011 | Nakamura | H01M 10/441 | 320/118 |
| 2012/0313439 A1 * | 12/2012 | Yamaguchi | H01M 10/425 | 307/71 |
| 2012/0326654 A1 * | 12/2012 | Ito | B60L 11/1816 | 320/103 |
| 2013/0002016 A1 * | 1/2013 | Furukawa | H01M 10/425 | 307/9.1 |
| 2013/0011704 A1 * | 1/2013 | Horne | B60L 11/1824 | 429/72 |
| 2013/0063154 A1 * | 3/2013 | Nakajima | B60L 3/0046 | 324/550 |
| 2013/0110430 A1 * | 5/2013 | Nishi | H01M 10/48 | 702/63 |
| 2014/0103877 A1 * | 4/2014 | Sahu | H01M 10/482 | 320/118 |
| 2014/0312828 A1 * | 10/2014 | Vo | H01M 10/4257 | 320/103 |
| 2014/0320061 A1 * | 10/2014 | Daniel | H01M 8/188 | 320/103 |
| 2015/0188325 A1 * | 7/2015 | Wagner | H02J 7/0085 | 307/31 |
| 2015/0302723 A1 * | 10/2015 | Reade | G08B 21/18 | 340/636.1 |
| 2016/0001748 A1 * | 1/2016 | Moskowitz | B60K 1/04 | 701/22 |

* cited by examiner

|  | Battery Status | | Configuration | | | | Charging Status | | Discharging Status | |
|---|---|---|---|---|---|---|---|---|---|---|
|  | Battery A | Battery B | SW1 | SW2 | SW3 | SW4 | Batt A | Batt B | Batt A | Batt B |
| Case 1 | Ready | Ready | Closed | Open | Open | Closed | C | C | D | D |
| Case 2 | Over-Charged | Ready | Open | Closed | Open | Closed |  | C | D | D |
| Case 3 | Ready | Over-Charged | Closed | Open | Closed | Open | C |  | D | D |
| Case 4 | Over-Charged | Over-Charged | Open | Open | Open | Closed |  |  | D | D |
| Case 5 | Absent | Ready | Open | Closed | Open | Closed |  | C |  | D |
| Case 6 | Ready | Absent | Closed | Open | Closed | Open | C |  | D |  |
| Case 7 | Absent | Absent | Open | Open | Open | Open |  |  |  |  |

Fig. 4

SERIAL MULTI-BATTERY CHARGER WITH INDEPENDENT SIMULTANEOUS CHARGE AND DISCHARGE

FIELD OF THE INVENTION

This invention relates to battery charger circuits, and more particularly to serial battery chargers with simultaneous charge and discharge.

BACKGROUND OF THE INVENTION

Energy harvester systems capture energy from varied sources, such as wind, movement of a person's arms, temperature differentials, pressure, or vibration. Since the power source may not be continuous, a battery may be used for storing energy, such as during calm periods of the wind. Batteries may need to be discharged continuously, even when being charged by the energy source. Thus simultaneous charging and discharging battery chargers are desirable in this and other applications.

Serial battery charging of two or more batteries may increase charging speed. Charging current may be balanced among several batteries in series. Reverse current between parallel batteries is avoided with serial charging.

However, serial charging may require a bypass path around an over-charged battery, or around a battery slot that has no battery installed. Sometimes the charging circuits are re-arranged when discharging occurs. Muxes or switches may be added to allow for circuit re-arrangement. Such circuit re-arrangement between charging and discharging operations is undesirable since simultaneous charging and discharging is not supported.

Blocking diodes are sometimes inserted in series with a battery. However, a series diode is undesirable since it may have a voltage drop, reducing the voltage and power applied to the battery. The diode voltage drop can seriously diminish efficiency.

What is desired is a serial battery charger that can simultaneously charge and discharge multiple batteries. A serial battery charger that protects individual batteries from over-charging is desirable. A serial battery charger that can bypass empty battery slot(s) in serial charging is desired. A serial battery charger that can output power from all batteries without circuit re-arrangement after charging is desired. Elimination of a blocking diode in series with a battery is also desirable. Balanced charging of multiple batteries without multiple charging units is also desired.

BRIEF DESCRIPTION OF THE DRAWINGS

FIG. 4 is a table of battery status and switch control signals.

DETAILED DESCRIPTION

The present invention relates to an improvement in battery chargers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
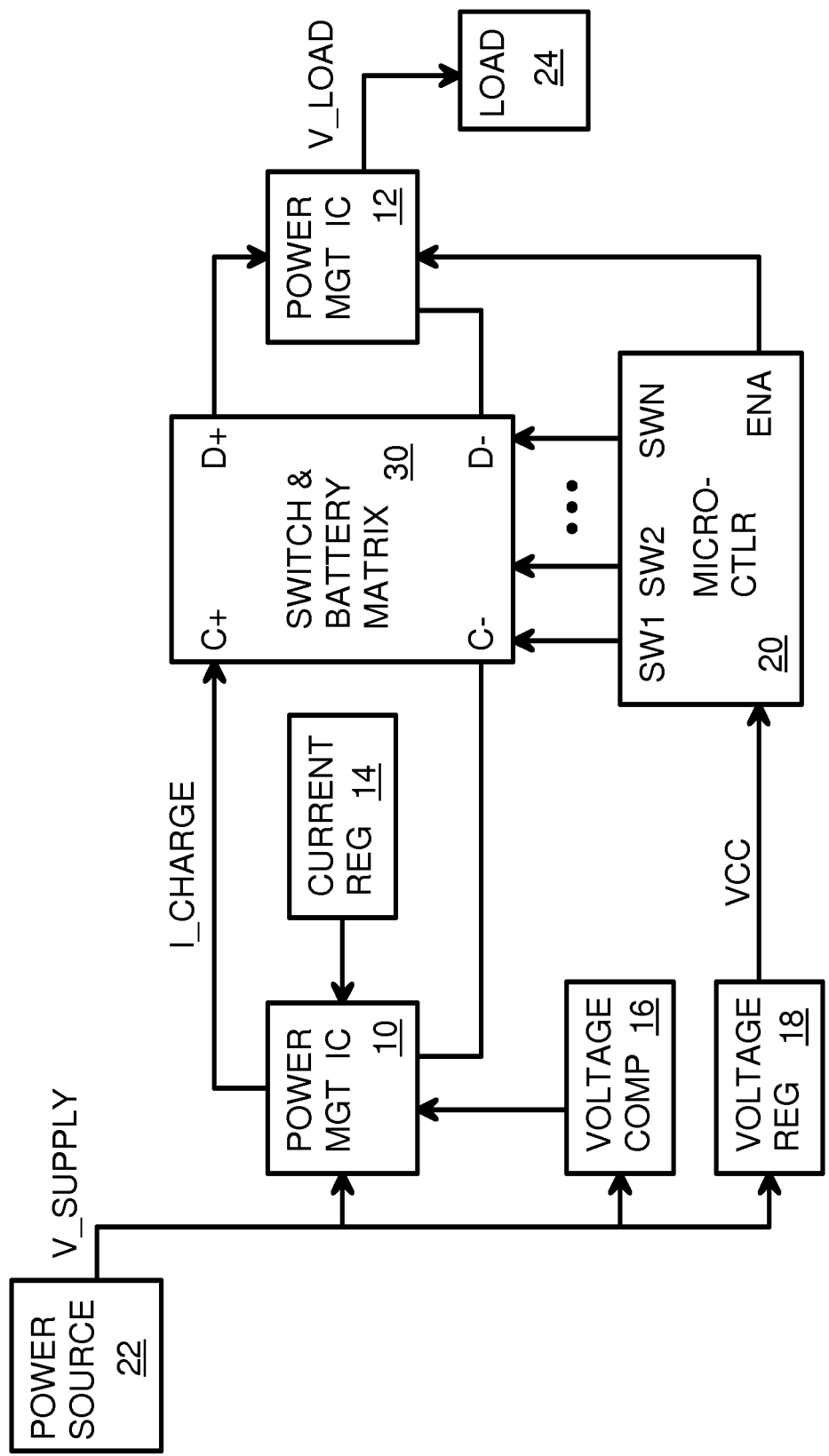
FIG. 1 is a block diagram of a serial battery charger.

FIG. 1 is a block diagram of a serial battery charger. Power source 22 could be an energy harvester or a standard A.C. adapter plugged into a wall socket. A supply voltage V_SUPPLY is output from power source 22 to Power Management Integrated Circuit (PMIC) 10, which generates a charging current I_CHARGE that is applied to the C+ input of switch & battery matrix 30, which contains two or more batteries. This current returns to PMIC 10 through the C− terminal of switch & battery matrix 30. Current regulator 14 helps PMIC 10 to regulate the charging current, such as by generating a reference voltage.

Voltage comparator 16 enables PMIC 10 when the supply voltage from power source 22 is above a specified value. When power source 22 is unable to generate a sufficiently large supply voltage, voltage comparator 16 disables PMIC 10 to halt charging.

Voltage regulator 18 generates a power-supply voltage VCC from the supply voltage from power source 22. This power-supply voltage VCC meets the requirements for power to microcontroller 20.

Microcontroller 20 generates switch control signals SW1, SW2, SW3, . . . SWN that control switches in switch & battery matrix 30. These switches direct the charging current from charging PMIC 10 to batteries that need charging while avoiding over-charged batteries, battery slots with no battery installed, and direct discharging current or all batteries present to terminal D+.

While first PMIC 10 controls the charging current through terminals C+, C−, a second PMIC, discharging PMIC 12, controls discharging current from terminals D+, D− in switch & battery matrix 30. Microcontroller 20 enables discharging PMIC 12 to generate output voltage V_LOAD that can power load 24.

Microcontroller 20 senses voltages within switch & battery matrix 30 and executes routines to determine which batteries are over-charged, partially charged, or absent. Based on these inputs, microcontroller 20 generates appropriate switch control signals SW1, SW2, . . . SWN to switch & battery matrix 30.

Figure 2:
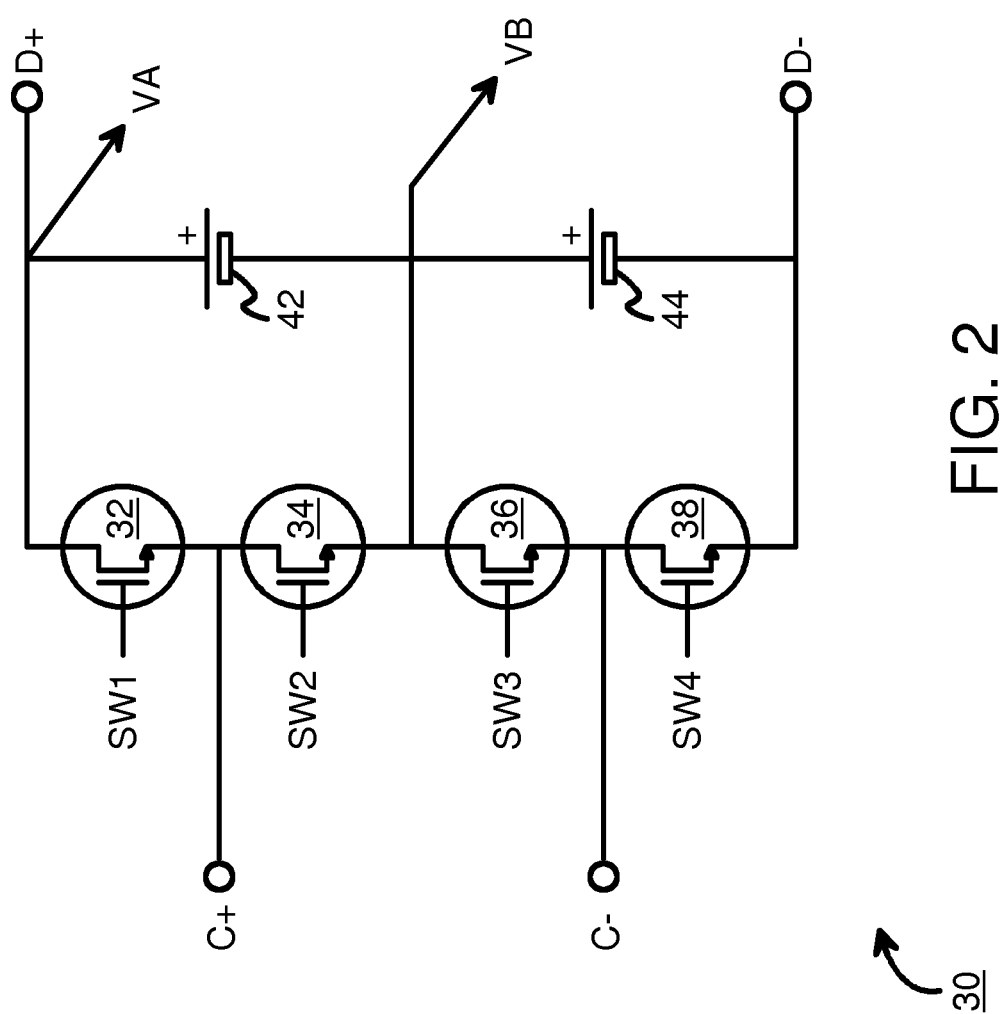
FIG. 2 shows the switch & battery matrix in more detail.

FIG. 2 shows the switch & battery matrix in more detail. This simple embodiment of switch & battery matrix 30 has two batteries and four switches.

First battery 42 is installed in a first slot between terminal D+ and node VB, while second battery 44 is installed in a second slot between node VB and terminal D−. Voltage VA of terminal D+ and voltage VB or node VB are read by microcontroller 20 (FIG. 1) to determine the status of batteries 42, 44. Based on the batteries status, microcontroller 20 generates switch controls signals SW1, SW2, SW3, SW4.

Switches 32, 34, 36, 38 form a matrix that allows charging and discharging currents to flow to one or both of batteries 42, 44. Switches 32, 34, 36, 38 may be n-channel transistors such as metal-oxide-semiconductor field-effect transistors (MOSFETs), either discrete or integrated with other components.

When switch control signals SW1 is active (high), switch 32 turns on (closes) to connect charging terminal C+ to discharging terminal D+. Charging current from C+ may flow to first battery 42. When switch control signals SW1 is inactive (low), switch 32 turns off (open) to disconnect charging terminal C+ from discharging terminal D+, preventing charging current to flow to first battery 42.

When switch control signals SW2 is active, switch 34 turns on to connect charging terminal C+ to node VB. Charging current from C+ may flow to second battery 44. When switch control signals SW2 is inactive, switch 34 turns off to disconnect charging terminal C+ from node VB.

When switch control signals SW3 is active, switch 36 turns on to connect charging terminal C− to node VB. Charging current may flow from first battery 42 to charging terminal C−. When switch control signals SW3 is inactive, switch 36 turns off to disconnect charging terminal C+ from node VB.

When switch control signals SW4 is active, switch 38 turns on to connect charging terminal C− to discharging terminal D−. When switch control signals SW4 is inactive, switch 38 turns off to disconnect charging terminal C+ from discharging terminal D−.

Figure 3A:
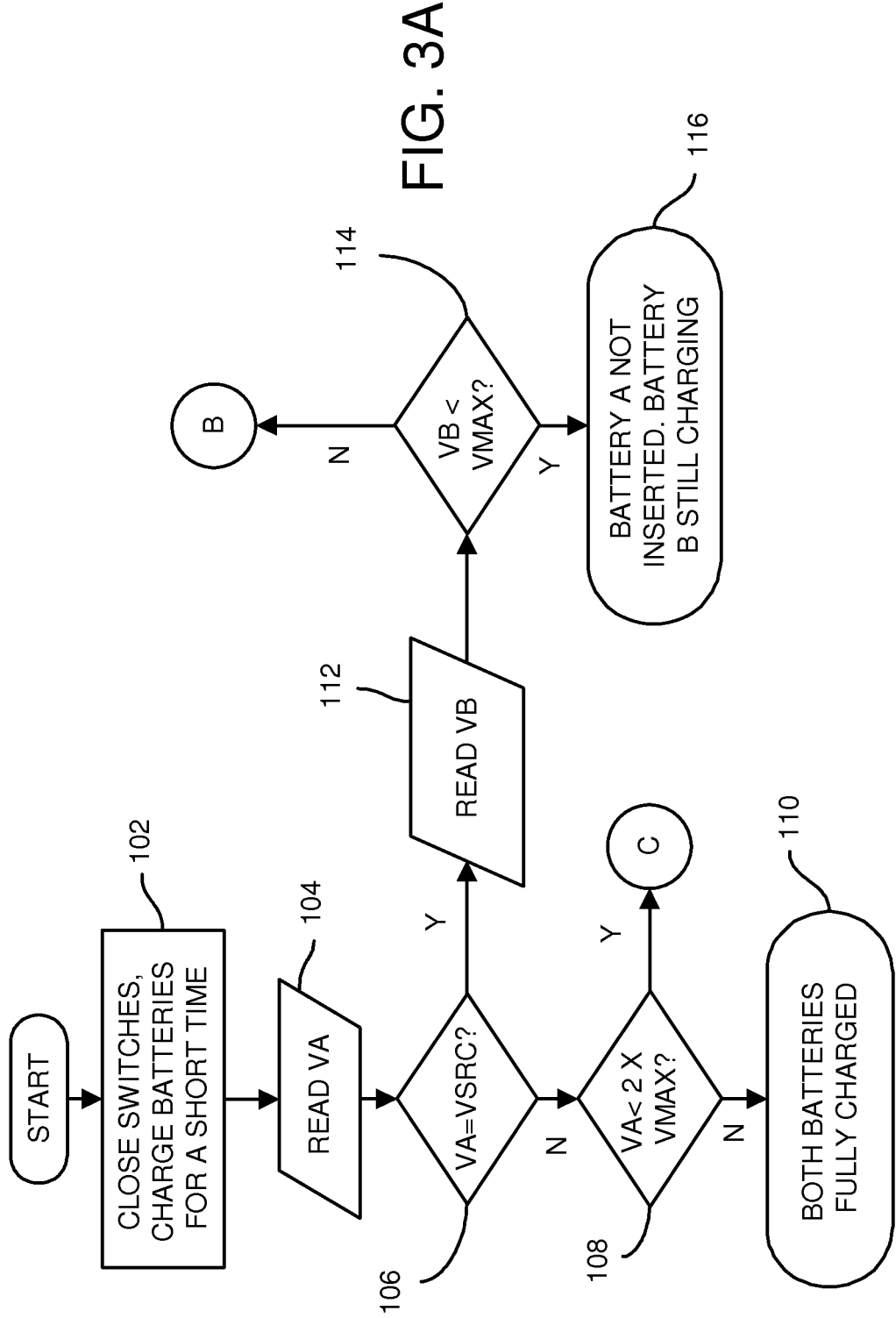
FIG. 3A-C is a flowchart of a battery status sensing routine.
Figure 3B:
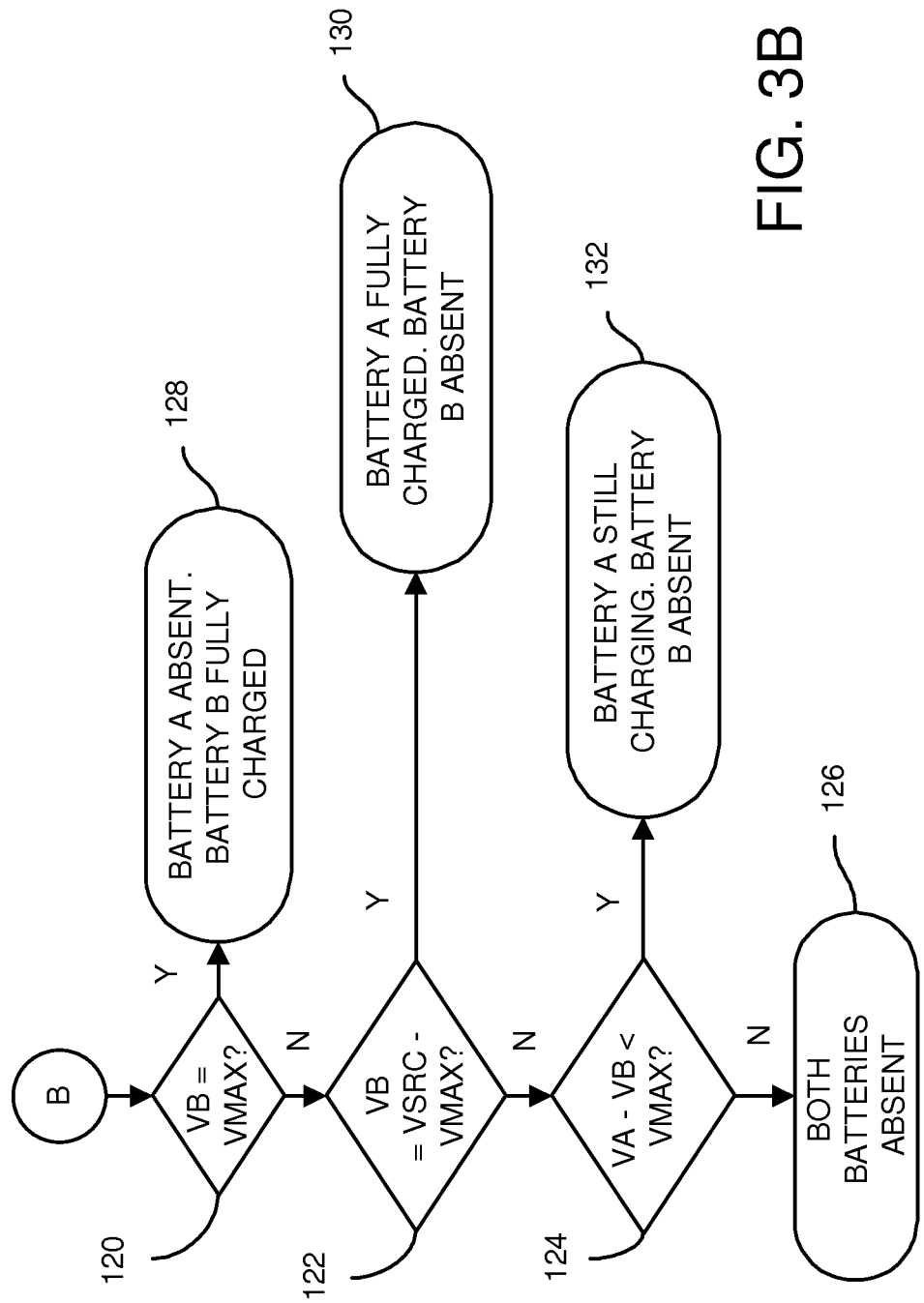
Figure 3C:
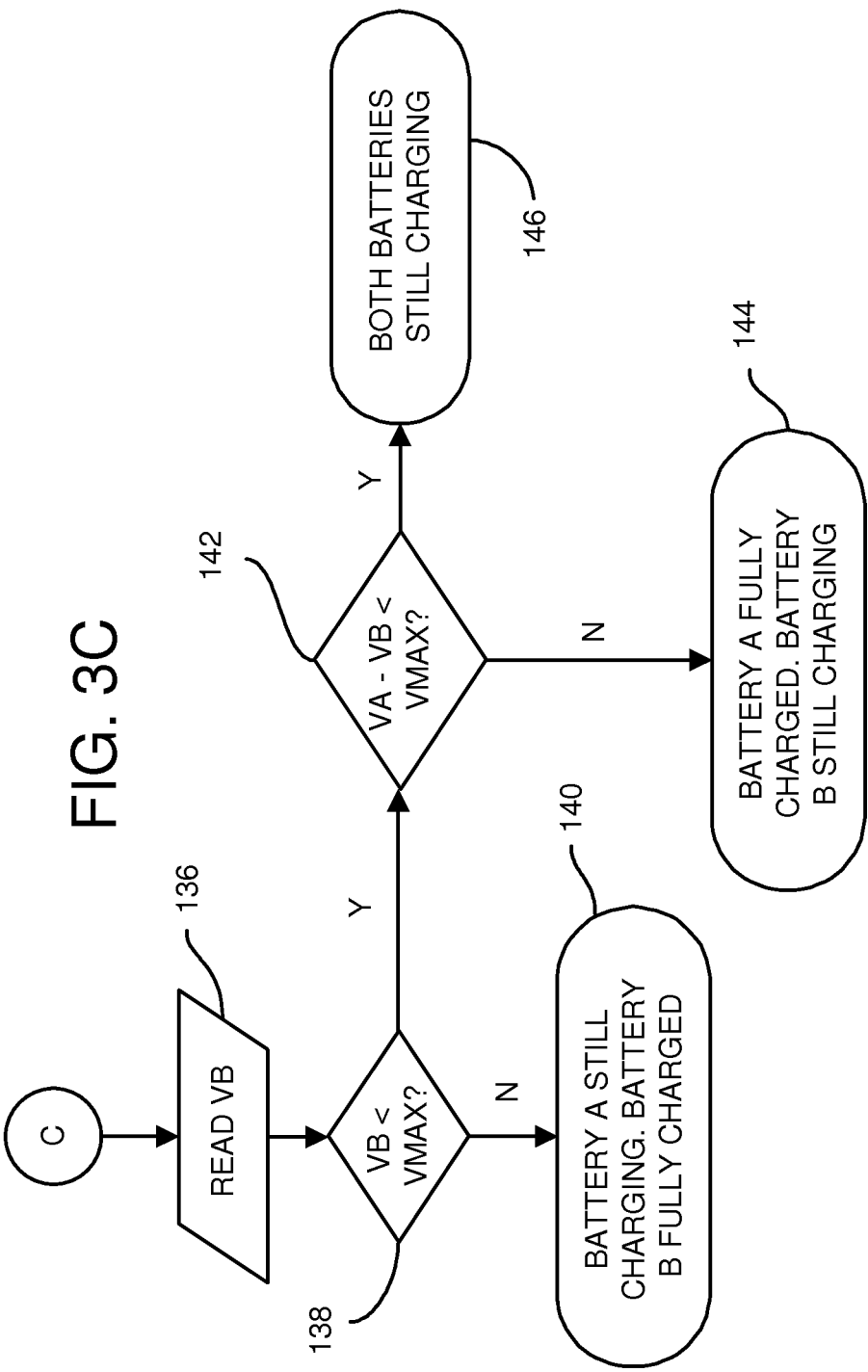

FIG. 3A-C is a flowchart of a battery status sensing routine. Microcontroller 20 (FIG. 1) may execute this routine to determine the battery status.

In FIG. 3A, when microcontroller 20 checks the battery status, the outer switches 32 and 38 are closed to charge the two batteries for a period of time, such as for 1 second, step 102. The time period is sufficient to partially charge the batteries to re-activate any over-discharged battery, but not long enough to damage a battery that is over-charged.

The microcontroller reads the voltage of the discharging terminal D+, VA, step 104. When VA does not equal the source voltage V_SUPPLY from power source 22, step 106, and VA is more than double V_MAX, step 108, then both batteries are fully charged. The status is both fully charged, step 110. V_MAX is the maximum voltage on a fully-charged battery.

When VA is not more than double V_MAX, step 108, then the process continues in FIG. 3C.

When VA equals the source voltage from power source 22, step 106, then voltage VB is read from the node between the two batteries, step 112. When VB is less than V_MAX, step 114, then battery B is still charging while battery A is not inserted since VA equaled V_SOURCE in earlier step 106. The battery status is set to A absent, B charging, step 116. Battery A is battery 42 while battery B is battery 44 in FIG. 2.

When VB not is less than V_MAX, step 114, then the process continues in FIG. 3B.

In FIG. 3B, VA was equal to the source voltage from earlier step 106, and VB was not less than V_MAX in earlier step 114. When VB equals V_MAX, step 120, then the battery status is set to battery A absent, battery B fully charged, step 128, since battery B has been charged to the maximum voltage V_MAX.

When VB equals V_SOURCE minus V_MAX, step 122, the battery status is changed to battery A fully charged, battery B absent, step 130, since the voltage across battery A is V_MAX, so battery A has been charged to the maximum voltage V_MAX.

When VA-VB is less than V_MAX, step 124, then battery A has less than the maximum voltage across it, so battery A is still charging. The battery status is changed to battery A charging, battery B absent, step 132.

Otherwise, the status is changed to both batteries absent, step 126.

In FIG. 3C, VA was not equal to the source voltage from earlier step 106, and VA was not more than double V_MAX, from earlier step 108. The microcontroller reads voltage VB from between the two batteries, step 136.

When VB is not less than V_MAX, step 138, then the battery status is set to battery A charging, battery B fully charged, step 140, since battery B has been charged to at least the maximum voltage V_MAX.

When VA-VB is less than V_MAX, step 142, then battery A has less than the maximum voltage across it, so battery A is still charging. Also, earlier step 138 found that battery B has less than V_MAX across it, so battery B is still charging. The battery status is changed to battery A charging, battery B charging, step 146.

When VA-VB is not less than V_MAX, step 142, then battery A has at least the maximum voltage across it, so battery A is fully charged. Also, earlier step 138 found that battery B has less than V_MAX across it, so battery B is still charging. The battery status is changed to battery A fully charged, battery B charging, step 144.

FIG. 4 is a table of battery status and switch control signals. Microcontroller executes the routine of FIGS. 3A-C to determine the battery status for each of the two batteries, either absent, fully charged (or over-charged), and charging (ready). There are seven possible cases of battery status, case 1 to case 7, which are shown in separate rows.

The microcontroller contains logic that generates the switch control signals SW1, SW2, SW3, SW4 as shown in the table. Switch control signals SW1, SW2, SW3, SW4 control switches 32, 34, 36, 38, respectively.

For example, SW1 can turn on (close) when battery A is charging (ready). SW4 is on (closed) when battery B is charging (ready). SW2 is on when battery B is charging (ready) and battery A is not charging (either absent or fully charged). SW3 is on when battery A is charging (ready) and battery B is not charging (either absent or fully charged).

The table in FIG. 4 also shows that battery A is charging C when battery A is ready, and discharging D when battery A is not absent. Likewise, battery B is charging C when battery B is ready, and discharging D when battery B is not absent.

FIGS. 5A-G show charging and discharging currents in the switch & battery matrix for the 7 cases of battery status of FIG. 4. Outer switches 32, 38 are blocking switches, since they are in series with a battery and can block the charging current around a battery to prevent over-charging of a fully-charged battery. Inner switches 34, 36 are bypass switches, since they are in parallel and can bypass the charging current to prevent over-charging a fully charged battery. The combination of bypassing and blocking current with the switches allows for charging current to be steered to the proper batteries as is shown in FIGS. 5A-G. Outer switches 32, 38 are blocking switches, which are used to block the charging current from the power source to the batteries by opening the switches. Inner switches 34, 36 are bypass switches, which are used to bypass the charging current from the power source to the batteries by closing the switches.

Figure 5A:
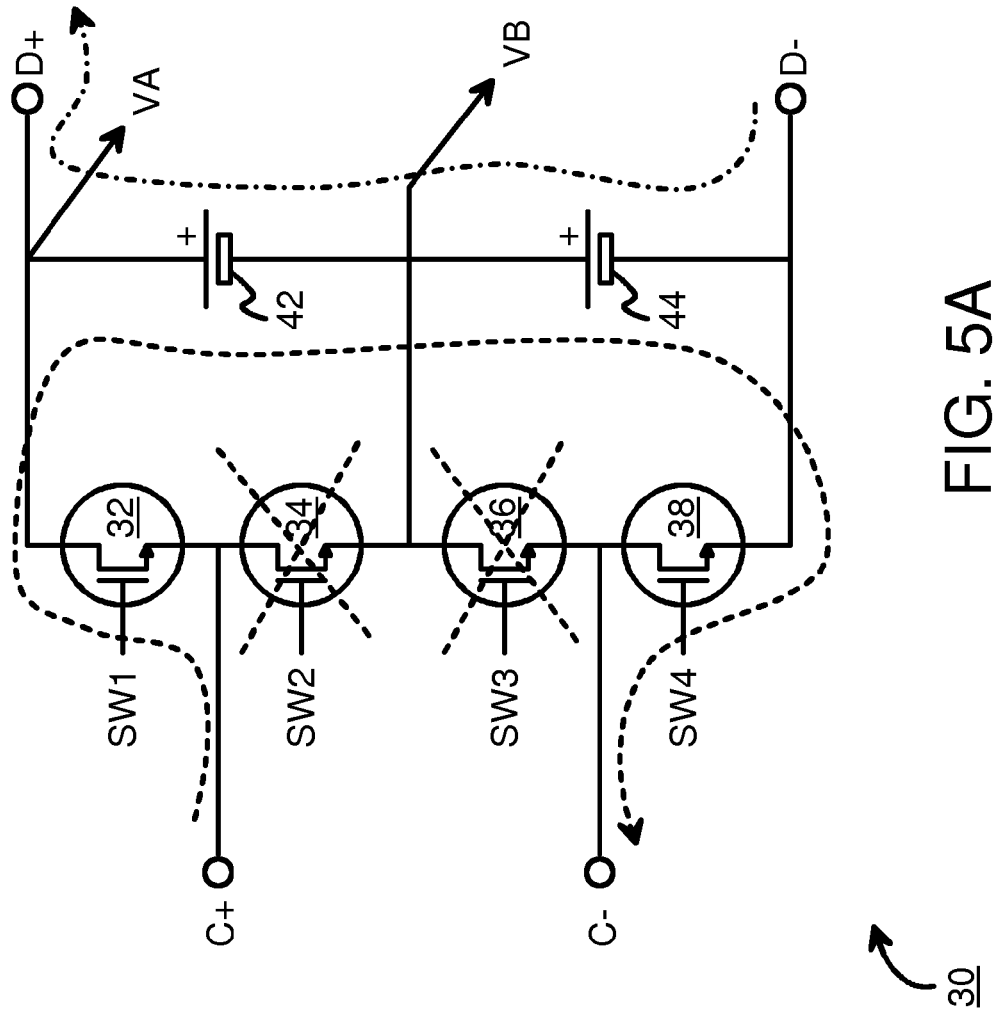
FIGS. 5A-G show charging and discharging currents in the switch & battery matrix for the 7 cases of battery status of FIG. 4.

FIG. 5A shows case 1. Both batteries 42, 44 are charging and both are discharging simultaneously. Blocking switches 32, 38 are turned on (closed) while bypass switches 34, 36 are turned off (open) in switch & battery matrix 30.

A charging current from charging PMIC 10 (FIG. 1) flows into charging terminal C+ and returns to charging PMIC through charging terminal C−. This charging current flows from charging terminal C+, through blocking switch 32 to terminal D+, then through battery 42 to intermediate node VB and then through second battery 44 to terminal D−, and finally through blocking switch 38 back to charging terminal C− to return to charging PMIC 10. The charging path has no diode, increasing charging efficiency.

When batteries 42, 44 are at least partially charged, they produce a voltaic force that can cause a discharge current to flow in a loop that includes batteries 42, 44. This discharge current created by batteries 42, 44 flows from discharge terminal D−, through second battery 44 to node VB, then through first battery 42 to discharge terminal D+, where this discharge current may power external devices such as load 24 attached to PMIC 12 (FIG. 1) before returning to discharge terminal D−.

Figure 5B:
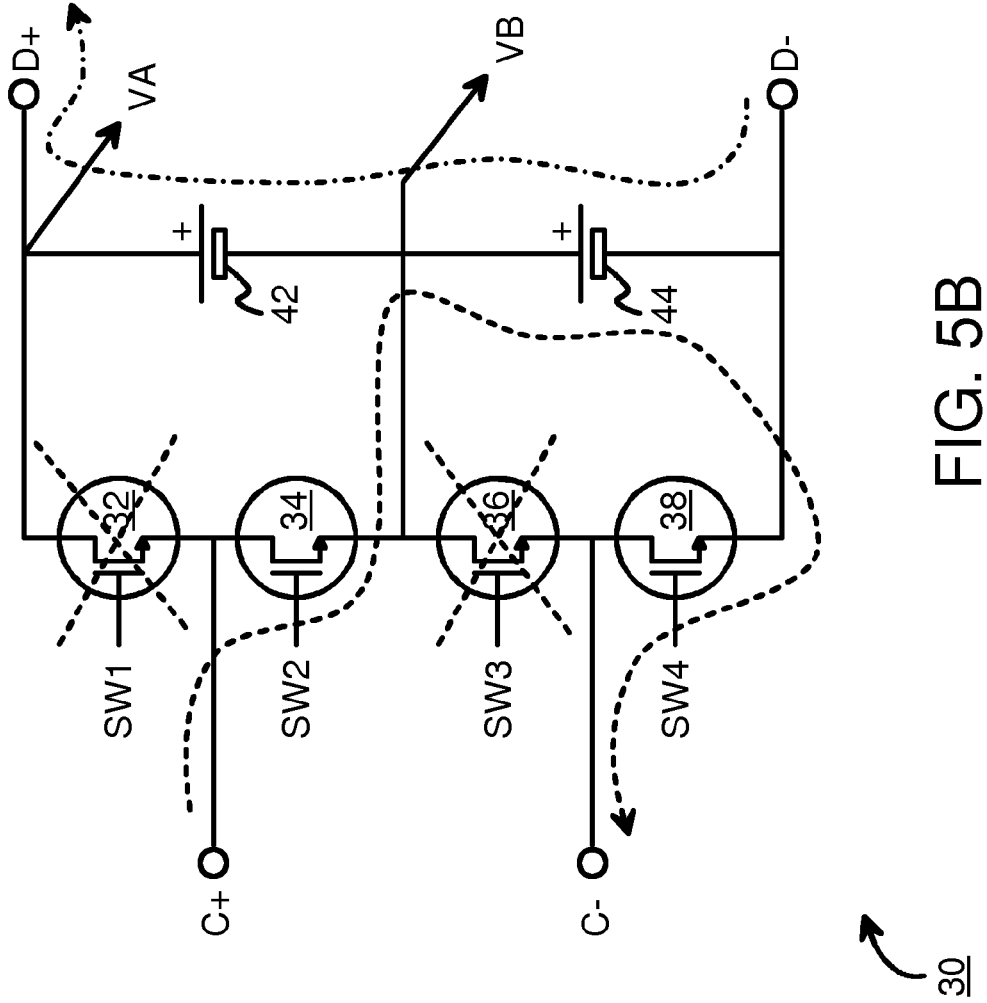

FIG. 5B shows case 2 of the table in FIG. 4. Battery 42 is over-charged while battery 44 is charging and both are discharged simultaneously. Blocking switch 32 turns off and bypass switch 34 turns on to bypass the charging current around first battery 42, which is over-charged and could be damaged by further charging. Bypass switch 36 is off and blocking switch 38 is on.

The charging current from charging terminal C+ flows through bypass switch 34 to intermediate node VB, then through second battery 44 to terminal D−, and back through blocking switch 38 to charging terminal C−. Although the charging current is bypassed around first battery 42, discharge current flows through both batteries 42, 44 in a loop through discharge terminals D+, D− to power an external load. Again, no diode is present in the charging or discharging loops, improving efficiency.

Figure 5C:
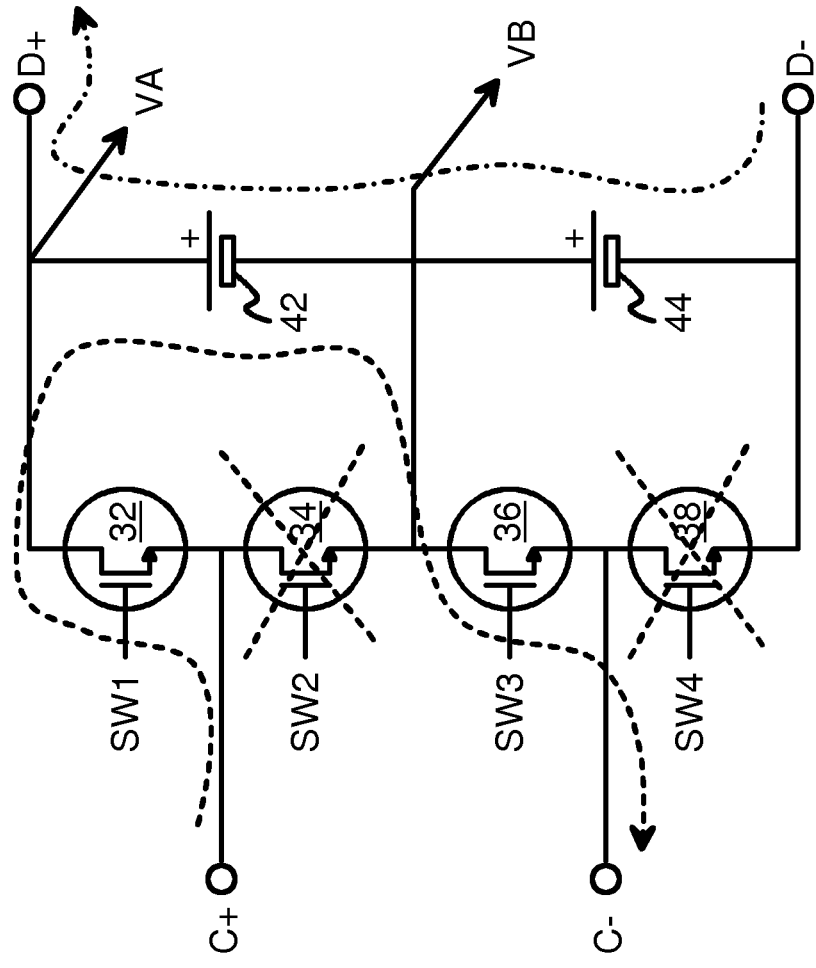

FIG. 5C shows case 3 of the table in FIG. 4. Battery 42 is charging while battery 44 is over-charged, and both batteries are discharged simultaneously. Blocking switch 38 turns off and bypass switch 36 turns on to bypass the charging current around second battery 44, which is over-charged and could be damaged by further charging. Bypass switch 34 is off and blocking switch 32 is on to charge first battery 42.

The charging current from charging terminal C+ flows through blocking switch 32 to terminal D+, then through first battery 42 to intermediate node VB, then through bypass switch 36 to charging terminal C−.

Although the charging current is bypassed around second battery 44, discharge current flows through both batteries 42, 44 in a loop through discharge terminals D+, D− to power an external load. Again, no diode is present in the charging or discharging loops, improving efficiency.

Figure 5D:
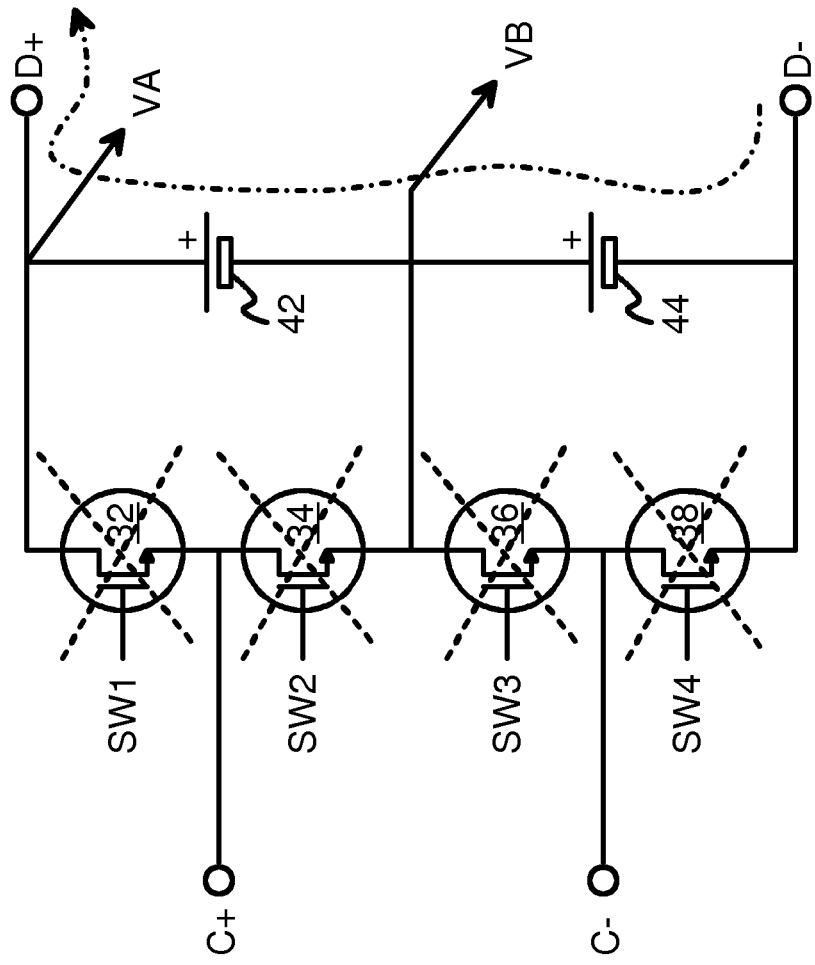

FIG. 5D shows case 4 of the table in FIG. 4. Both batteries 42, 44 are over-charged, and both batteries are discharged simultaneously. All four switches 32, 34, 36, 38 turn off. No charging current flows into either of batteries 42, 44, which are over-charged and could be damaged by further charging.

Discharge current flows through both batteries 42, 44 in a loop through discharge terminals D+, D− to power an external load.

Figure 5E:
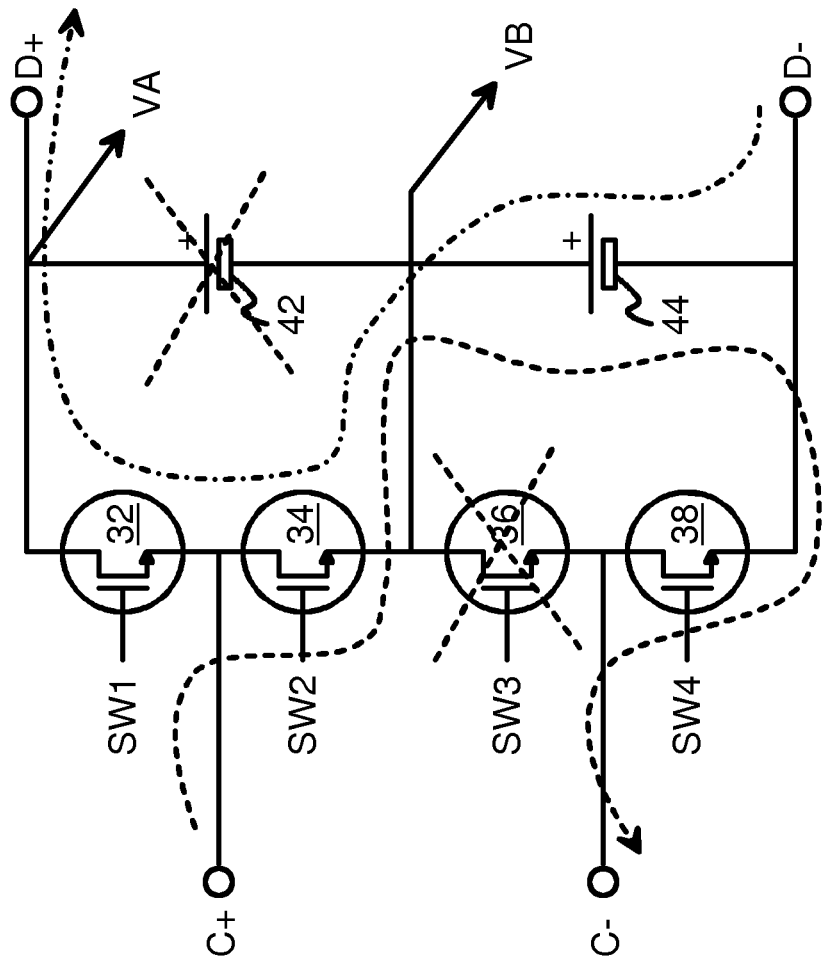

FIG. 5E shows case 5 of the table in FIG. 4. First battery 42 is absent—the slot, clip, or place for the first battery is empty. Second battery 44 is charging and discharging simultaneously. Since first battery 42 is absent, no current can flow directly from discharge terminal D+ to intermediate node VB. Instead, switches 32, 34 turn on to allow discharge current generated by second battery 44 to flow to discharge terminal D+ through switches 32, 34. This discharge current returns from the external load at discharge terminal D−. Thus second battery 44 powers the external load when first battery 42 is absent.

The charging current from charging terminal C+ flows through bypass switch 34 to intermediate node VB, then through second battery 44 to discharge terminal D−, and back through blocking switch 38 to charging terminal C−. Again, no diode is present in the charging or discharging loops, improving efficiency.

Figure 5F:
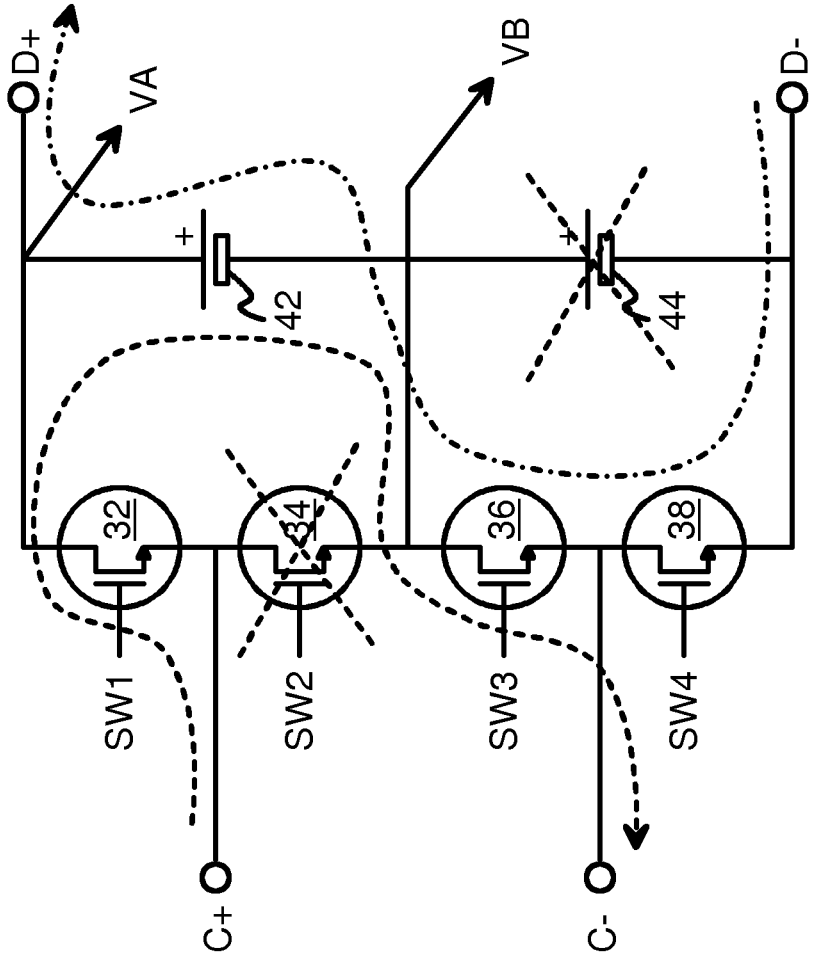

FIG. 5F shows case 6 of the table in FIG. 4. Second battery 44 is absent but first battery 42 is charging and discharging simultaneously. Since second battery 44 is absent, no current can flow directly to discharge terminal D− from intermediate node VB. Instead, switches 36, 38 turn on to allow discharge current generated by first battery 42 that flows to discharge terminal D+ and the external load to return to first battery 42 through discharge terminal D− and switches 36, 38. Thus first battery 42 powers the external load when second battery 44 is absent.

Bypass switch 34 is off and blocking switch 32 is on to charge first battery 42. The charging current from charging terminal C+ flows through blocking switch 32 to first battery 42 to intermediate node VB, then back to charging node C− through bypass switch 36.

Figure 5G:
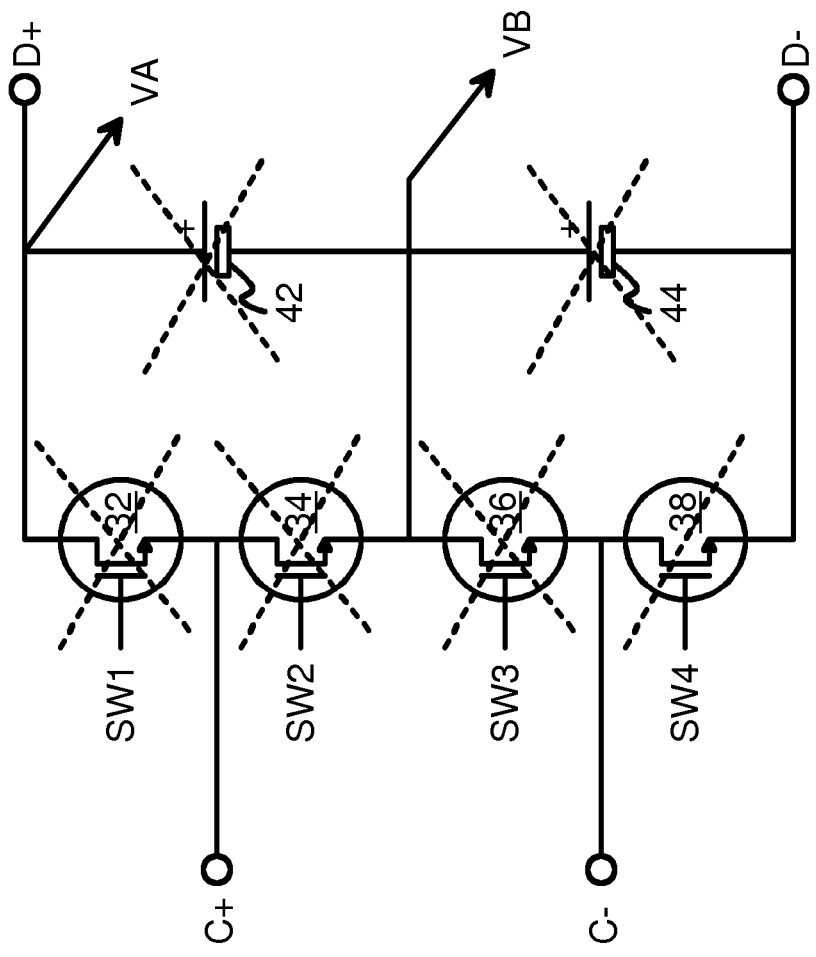

FIG. 5G shows case 7 of the table in FIG. 4. Both batteries 42, 44 are absent. All four switches 32, 34, 36, 38 turn off. No charging current or discharging flows into or from either of batteries 42, 44, which not present.

Figure 6:
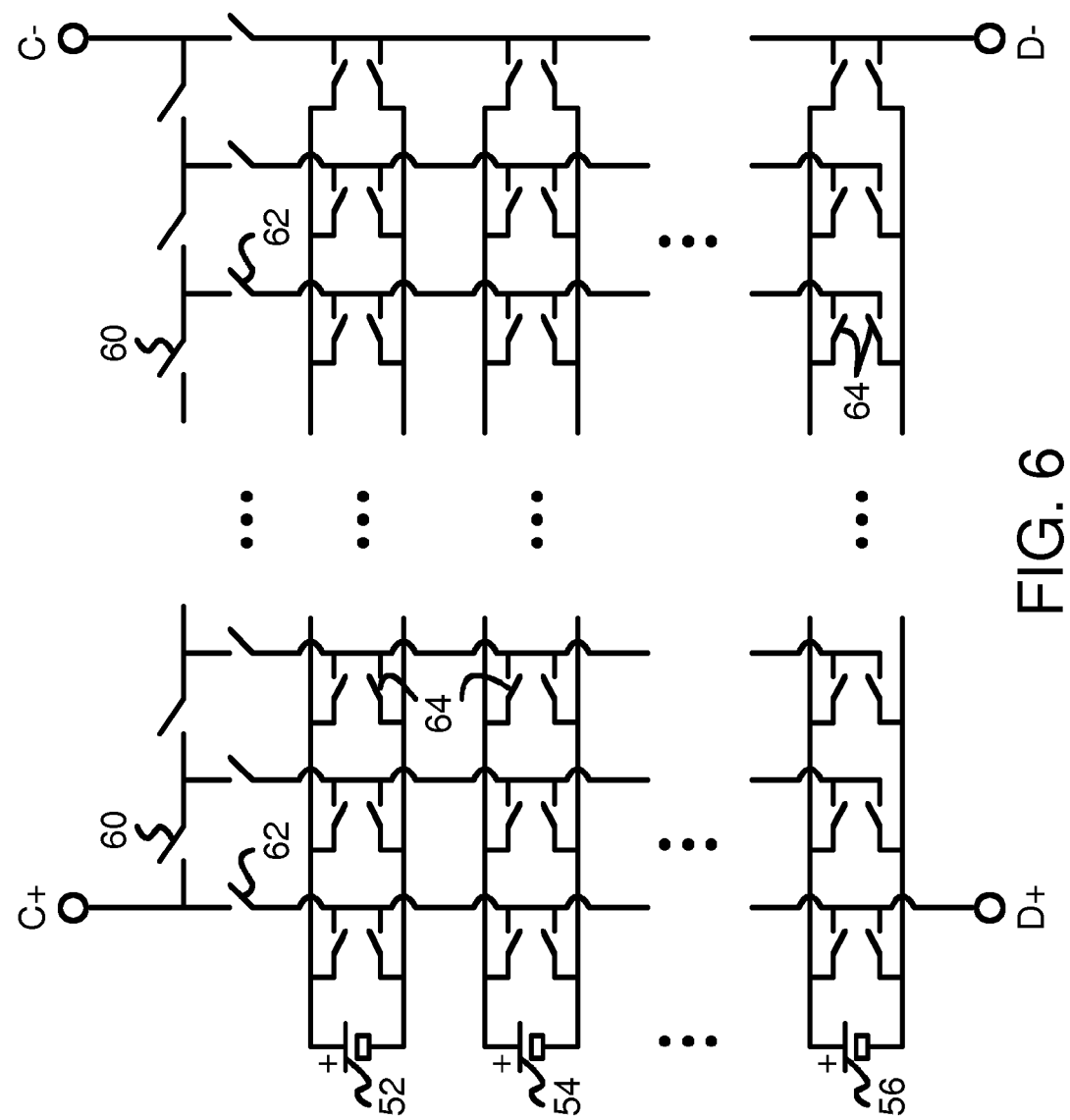
FIG. 6 shows a switch & battery matrix having an arbitrarily large number of batteries.

The concept of bypass and blocking switches can be extended for switch & battery matrices having more than two batteries. FIG. 6 shows a switch & battery matrix having an arbitrarily large number of batteries. Each row in the matrix has one battery 52, 54, . . . 56 and two row lines. A positive row line connects to the positive terminal of the row's battery, while a negative row line connects to the negative terminal of the row's battery. Connecting switches 64 are placed at each intersection of a row line and a column line. Connecting switches 64 allow any row line to connect to any column line.

The first column line connects to discharge terminal D+, while the last column line connects to discharge terminal D−. The number of column lines is N+1, where N is the number of batteries.

Bypass switches 60 connect charging terminals C+ and C− to the top of one or more of the columns. Blocking switches 62 block the charging currents from reaching a column line when open, and connect a top of a column to a column line when closed. Bypass switches 60 and blocking switches 62 operate with each other to route the positive charging current to one of the column lines, and to receive the return charging current from another one of the column lines.

Figure 7A:
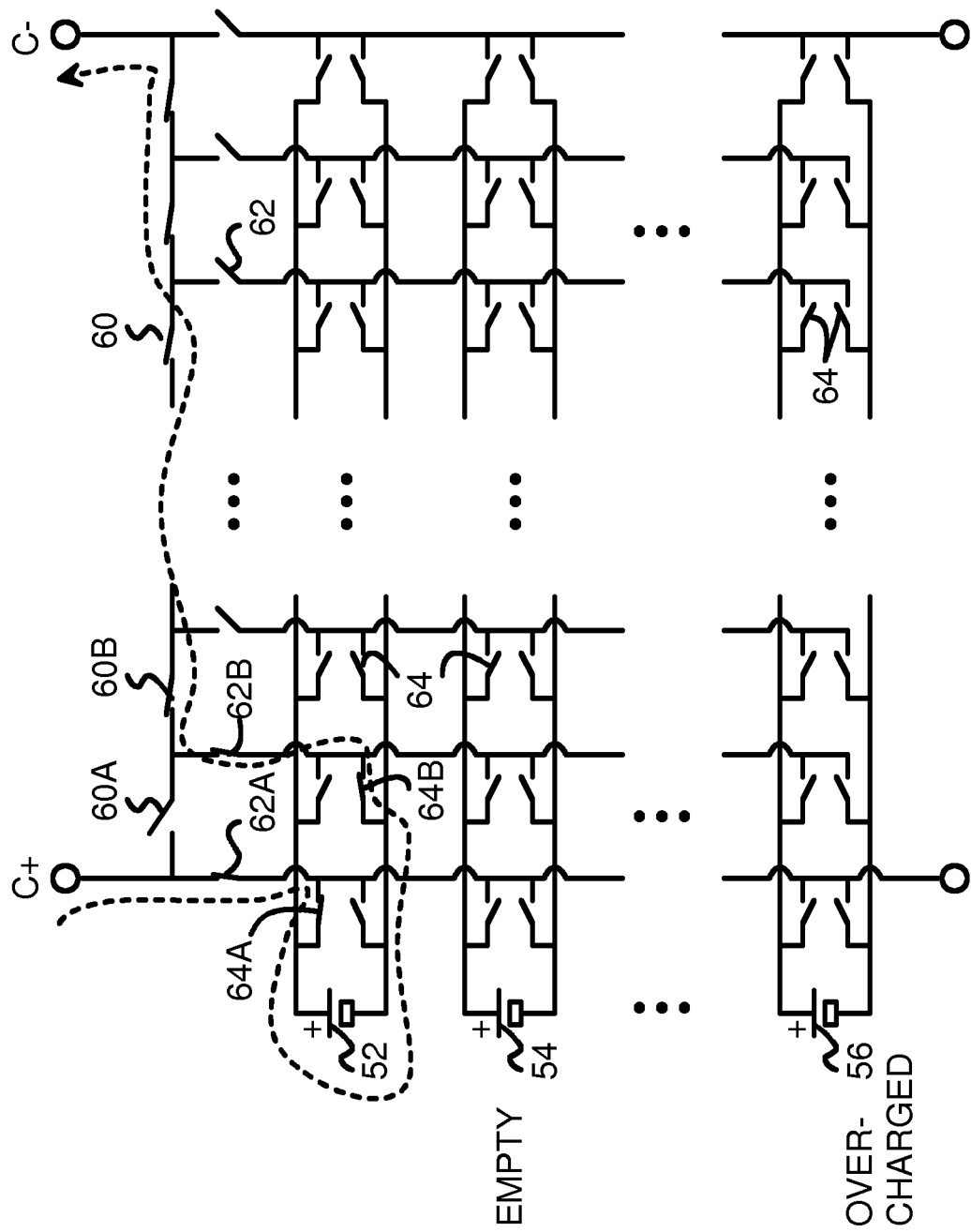
FIGS. 7A-B show a sample configuration of the switch & battery matrix of FIG. 6.
Figure 7B:
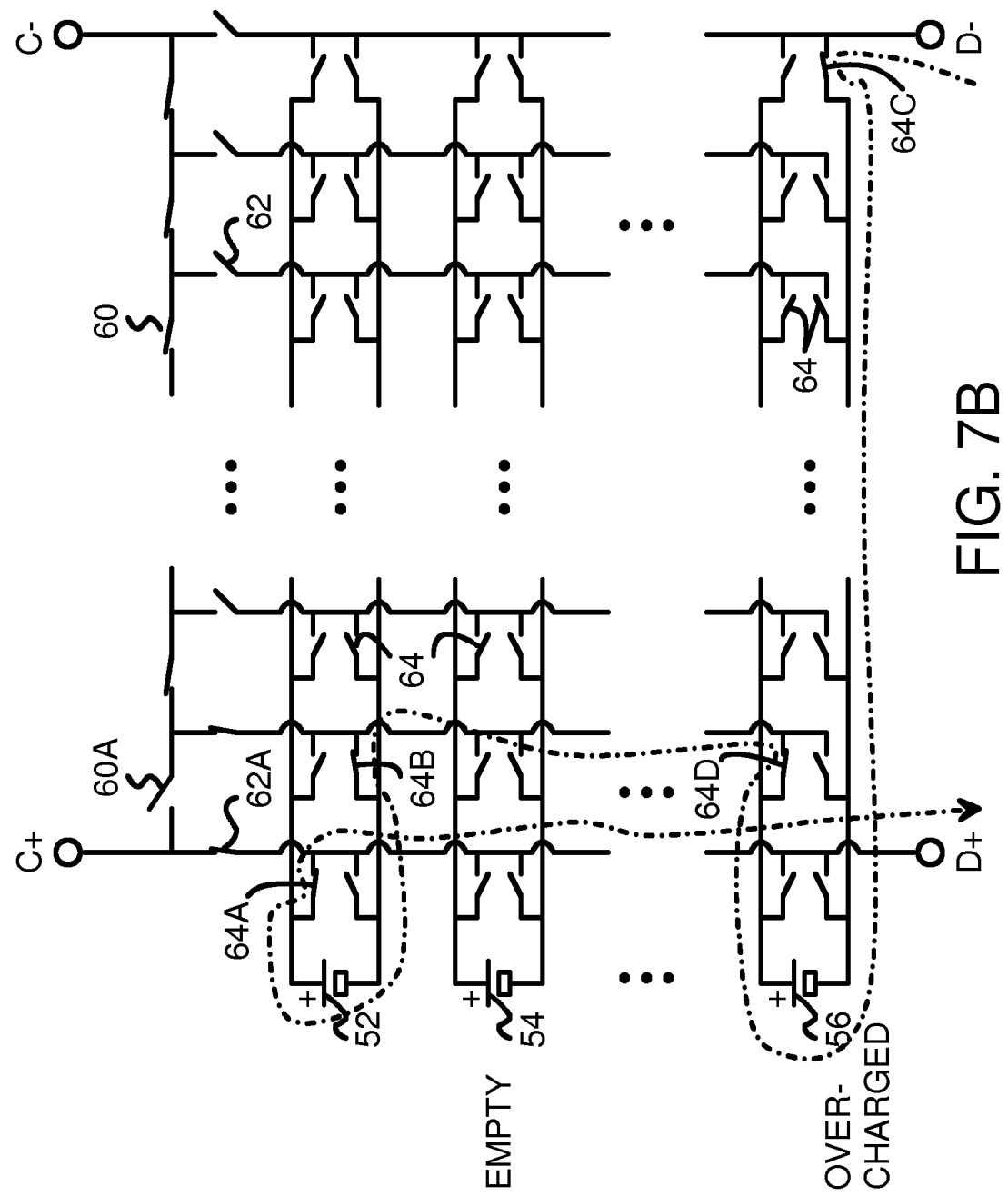

FIGS. 7A-B show a sample configuration of the switch & battery matrix of FIG. 6. Many configurations are possible. In this sample configuration, battery 52 is charging and discharging, battery 54 is absent, and battery 56 is overcharged. Additional column lines could be switched in a similar manner to accommodate more batteries.

FIG. 7A shows the charging current loop for the sample configuration. Bypass switch 60A is open and all other bypass switches 60 are closed. First blocking switch 62A is closed, allowing the charging current from charging terminal C+ to flow through switch 62A to the first column line. Second blocking switch 62B is closed, allowing the return charging current from the second column line to return to charging terminal C−through closed bypass switches 60B, 60.

Connecting switch 64A is closed to allow the charging current on the first column line to flow to the first positive row line. All other connecting switches 64 on the first positive row line are open, so the charging current can only flow to the positive terminal of first battery 52. First battery 52 is charged by this charging current, which returns from the negative terminal of first battery 52, across the first negative row line, and through closed connecting switch 64B to the second column line. From the second column line, the charging current returns to charging terminal C− through closed blocking switch 62B and closed bypass switches 60B, 60. All other connecting switches 64 on the first negative row line are open. No other batteries are charging in this sample configuration.

If other charging batteries were present, additional column lines would be used and connected by connecting switches 64.

FIG. 7B shows the discharging current loop for the sample configuration. The switches are configured the same as in FIG. 7A. Batteries 52, 56 are connected in series to generate the discharge current, while battery 54 is absent and not connected or bypassed.

The discharge return current from discharge terminal D− connects to the last column line and then through closed connecting switch 64C to the last negative row line, which is connected to the negative terminal of last battery 56. The positive terminal of last battery 56 connects to the last positive row line, which connects through closed connecting switch 64D to the second column line.

The second column line also connects to the first negative row line through closed connecting switch 64B. The first negative row line is connected to the negative terminal of first battery 52.

The positive terminal of first battery 52 connects to the first positive row line, which connects through closed connecting switch 64A to the first column line. The first column line is connected to discharge terminal D+.

More complex routing of currents is possible than the simple example shown here. When additional batteries are present, additional rows and columns will be accessed by connecting switches, and bypass switches will route the returning charging current from a column more to the right since more columns will be in use. Sophisticated routing optimization routines using known techniques may be executed by the microcontroller to generate switch configurations when many batteries are present in a large switch matrix. Alternately, all possible battery configurations could be determined, and a table lookup performed to find the switch configuration to use for any combination of battery statuses.

Note that the first column line is shared by both charging and discharging current loops. Likewise, the second column line is also shared, as are the closed connecting switches. No diodes are needed, increasing efficiency. The switch & battery matrix does not need to be re-configured for charging and discharging since the same connecting switches, column lines, and row lines are used for both charging and discharging loop currents.

ALTERNATE EMBODIMENTS

Several other embodiments are contemplated by the inventors. For example start-up circuitry could be added such as switches that pre-set nodes at initialization. The battery charger may be adjusted to accommodate other power sources or supplies or may be designed to operate with both 50 Hz and 60 Hz power schemes when a rectifier bridge is used to convert AC to DC. Various power sources may be substituted. Many variations of power regulation and charging are also possible.

The order or sequence of components may be altered. Some components may be present in a real circuit that are not shown here, such as circuitry to block glitches and prevent false triggering. Some circuitry may be eliminated or bypassed. Capacitors, resistors, or inductors may be added such as for filtering.

Serial battery charging provides for balance charging since the charging current passes through all batteries to be charged. Reverse leakage among batteries is avoided while providing a good charging speed with serial charging. The discharging current may pass serially through all fully-charged and all charging batteries in any order, with charging batteries interspersed between fully-charged batteries. Bypass diodes are not needed to bypass currents around absent batteries since the bypass switches perform this function without a diode voltage drop. The same switch configuration is used for both charging and discharging currents, eliminating the need to change the switches or re-configure the switch matrix or stop the currents between charging and discharging operations. Instead, charging and discharging may occur at the same time, simultaneously. Alternately, the microcontroller could activate the charging PMIC and the discharging PMIC at alternating time slots so that the charging and discharging currents do not flow at exactly the same time, even if they are capable of simultaneous flow.

A single PMIC or other charging current generator may be used since the batteries are charged serially. Parallel charging current generators are not needed, cutting charger cost.

The switches can be power metal-oxide-semiconductor field-effect transistor (MOSFETs), n-channel transistors, transmission gates with parallel n-channel and p-channel transistors, etc. Switches may be n-channel transistors with their substrate or bulk node connected to their sources or to a back bias voltage. These transistors may be integrated with other components or may be discrete. P-channel rather than n-channel transistors may be used for some technologies or processes, and inversions, buffers, capacitors, resistors, gates, or other components may be added to some nodes for various purposes and to tweak the converter. Power transistors may have larger than minimum physical dimensions, such as longer gate lengths. Guard rings and other structures may be added.

The load may be a motor, circuit, lighting such as one or more LED's, or other loads and combinations of loads. Currents may be positive currents of positive charge, or may flow in a reverse direction as negative charges.

While a serial battery charger has been described, parallel charging paths could be added so that there are several serial paths in parallel with each other. Each battery could have multiple battery cells in series or in parallel. The battery slots could have a variety of shapes and arrangements. While a power-management IC has been described, other circuits could be used that generate the charging current or that route the discharging current to a load. Step-up or step-down power converters could be used for the PMIC's when voltage changes are required. A transformer could be used to convert and isolate different voltages. Diodes may be present in the power converters or other circuits while being absent from the battery and switch matrix and thus not be in the charging or discharging current paths through the battery matrix. Integrated or discrete components could be used.

While a sample battery status detection routine has been shown in the flowchart, the steps could be performed in other sequences. Steps may be altered or rearranged in many ways. When more than two batteries are present, the routine may be expanded to generate the status of each battery by detecting the voltage across each battery slot. The detection routine and other operations by the microcontroller could be stored in software, firmware, or be hardwired, or in various combinations.

The terms over-charged and full-charged have been used interchangeably. This is because a fully-charged battery is protected from over-charging by the invention. The over-charged state could refer to batteries that are fully charged as well as batteries that are over-charged beyond a maximum charge. The term over-charged may thus refer to batteries that are protected from over-charging and should not be charged any further.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A serial battery charger comprising:
   a first power manager that generates a charging current from a power source, the charging current flowing into a first charging terminal and returning from a second charging terminal of a battery matrix;
   a second power manager that receives a discharging current, the discharging current flowing from a first discharging terminal, through the second power manager and a load, and returning to a second discharging terminal;
   the battery matrix having a first battery slot and a second battery slot each for receiving a battery, the battery being in a charging state when a voltage across the battery is less than a maximum voltage, the battery being in an over-charge-protected state when the voltage across the battery exceeds the maximum voltage, the battery being in an absent state when the battery is not present in the battery slot;
   a microcontroller that reads voltages within the battery matrix to determine when the voltage across the battery exceeds or is less than the maximum voltage, the microcontroller determining states of batteries in the battery matrix and generating a switch configuration based on the states of the batteries;
   a plurality of switches in the battery matrix, the plurality of switches being controlled by the switch configuration generated by the microcontroller,
   wherein the microcontroller generates the switch configuration to configure the plurality of switches to allow the discharging current to flow between the first and second discharging terminals, wherein the discharging current flows serially through all of the batteries in the charging state and all of the batteries in the over-charge-protected state that are installed in the battery matrix;
   wherein the switch configuration also configures the plurality of switches to allow the charging current to flow between the first and second charging terminals, wherein the charging current flows serially through all of the batteries in the charging state and none of the batteries in the over-charge-protected state and none of the batteries in the absent state in the battery matrix;
   wherein the battery matrix comprises:
   a first battery in a first battery slot;
   a second battery in a second battery slot;
   an intermediate node between a negative terminal of the first battery and a positive terminal of the second battery;
   wherein a positive terminal of the first battery is connected to the first discharging terminal;
   wherein a negative terminal of the second battery is connected to the second discharging terminal,
   whereby the first battery and the second battery are connected in series between the first discharging terminal and the second discharging terminal;
   wherein the plurality of switches in the battery matrix comprises:
   a first switch coupled to conduct current between the first discharging terminal and the first charging terminal;
   a second switch coupled to conduct current between the first charging terminal and the intermediate node;
   a third switch coupled to conduct current between the intermediate node and the second charging terminal; and
   a fourth switch coupled to conduct current between the second charging terminal and the second discharging terminal.

2. The serial battery charger of claim 1 wherein the first switch, the second switch, the third switch, and the fourth switch each comprises an n-channel transistor having a gate controlled by a signal from the microcontroller.

3. The serial battery charger of claim 1 wherein the microcontroller generates the switch configuration to open the first switch and prevent current flow between the first discharging terminal and the first charging terminal when the first battery is absent or in the over-charge-protected state;
   wherein the microcontroller generates the switch configuration to open the fourth switch and prevent current flow between the second discharging terminal and the second charging terminal when the second battery is absent or in the over-charge-protected state;
   wherein the microcontroller generates the switch configuration to close the second switch and conduct current flow between the first charging terminal and the intermediate node when the second battery is in the charging state and the first battery is absent or in the over-charge-protected state;
   wherein the microcontroller generates the switch configuration to close the third switch and conduct current flow between the intermediate node and the second discharging terminal when the first battery is in the charging state and the second battery is absent or in the over-charge-protected state.

4. The serial battery charger of claim 3 wherein the microcontroller executes a battery status routine which comprises:
reading a first voltage of the first discharging terminal;
when the first voltage is at least twice a maximum voltage of a fully-charged battery, indicating that the first battery is in the over-charge-protected state and indicating that the second battery is in the over-charge-protected state;
reading a second voltage of the intermediate node;
when a voltage across the first battery is less than the maximum voltage, indicating that the first battery is in the charging state;
when the second voltage is less than the maximum voltage, and indicating that the second battery is in the charging state; and
when the second voltage meets or exceeds the maximum voltage, and indicating that the second battery is in the over-charge-protected state.

5. The serial battery charger of claim 1 wherein the battery matrix comprises three batteries in series;
wherein each battery slot comprises a positive terminal for connecting to a positive terminal of the battery, and a negative terminal for connecting to a negative terminal of the battery;
further comprising:
a plurality of row lines including positive row lines and negative row lines, wherein each battery slot has a positive terminal connected to a positive row line and a negative terminal connected to a negative row line;
a plurality of column lines;
wherein the plurality of switches further comprises:
a plurality of connecting switches, each connecting switch being coupled between a row line and a column line and allowing current to flow between the row line and the column line when the connecting switch is closed, but blocking current flow between the row line and the column line when the connecting switch is open.

6. A multiple battery charger comprising:
a plurality of battery slots, each battery slot for accepting a battery;
a plurality of blocking switches, each blocking switch being in series with a battery slot in the plurality of battery slots;
a plurality of bypass switches, each bypass switch being in parallel with a battery slot in the plurality of battery slots;
a charging current generator that uses a power source to generate a charging current that flows into a first charging node, in series through a plurality of charging batteries installed in the plurality of battery slots, and returning through a second charging node;
a discharging current load that receives from a first discharging node a discharging current generated by the plurality of charging batteries and by a plurality of fully-charged batteries installed in the plurality of battery slots, and returns to the plurality of battery slots through a second discharging node;
wherein the discharging current is routed in series through each battery of the fully-charged and charging batteries installed in the plurality of battery slots;
a microcontroller that reads a first voltage of the first discharging node, and at least one intermediate voltage of an intermediate node between batteries, the microcontroller selecting a switch configuration based on voltages read, the switch configuration generating control signals to control the plurality of blocking switches and the plurality of bypass switches to route the charging current to all charging batteries and to none of the fully-charged batteries and to none of the plurality of battery slots missing a battery, and to route the discharging current to all charging batteries and to all of the fully-charged batteries in series and to none of the plurality of battery slots missing a battery;
wherein the charging current and the discharging current flow at a same time, sharing at least some switches in the plurality of bypass switches and in the plurality of blocking switches;
wherein the charging current is routed to charging batteries and bypassed around fully-charged batteries while the discharging current is routed to charging batteries and fully-charged batteries;
wherein the charging current flows without a diode voltage drop due to a diode in a path of the charging current;
wherein the discharging current flows without a diode voltage drop due to a diode in a path of the discharging current;
whereby diode voltage drops are avoided and whereby simultaneous charging and discharging currents flow serially through batteries.

7. The multiple battery charger of claim 6 wherein the plurality of battery slots comprises three battery slots in series.

8. The multiple battery charger of claim 6 wherein each battery slot comprises a positive terminal for connecting to a positive terminal of the battery, and a negative terminal for connecting to a negative terminal of the battery;
further comprising:
a plurality of row lines including positive row lines and negative row lines, wherein each battery slot has a positive terminal connected to a positive row line and a negative terminal connected to a negative row line;
a plurality of column lines;
a plurality of connecting switches, each connecting switch being coupled between a row line and a column line and allowing current to flow between the row line and the column line when the connecting switch is closed, but blocking current flow between the row line and the column line when the connecting switch is open.

9. A multiple battery charger comprising:
a plurality of battery slots, each battery slot for accepting a battery;
a plurality of blocking switches, each blocking switch being in series with a battery slot in the plurality of battery slots;
a plurality of bypass switches, each bypass switch being in parallel with a battery slot in the plurality of battery slots;
a charging current generator that uses a power source to generate a charging current that flows into a first charging node, in series through a plurality of charging batteries installed in the plurality of battery slots, and returning through a second charging node;
a discharging current load that receives from a first discharging node a discharging current generated by the plurality of charging batteries and by a plurality of fully-charged batteries installed in the plurality of battery slots, and returns to the plurality of battery slots through a second discharging node;
wherein the discharging current is routed in series through each battery of the fully-charged and charging batteries installed in the plurality of battery slots;
a microcontroller that reads a first voltage of the first discharging node, and at least one intermediate voltage of an intermediate node between batteries, the microcontroller selecting a switch configuration based on voltages read, the switch configuration generating control signals to control the plurality of blocking switches and the plurality of bypass switches to route the charging current to all charging batteries and to none of the fully-charged batteries and to none of the plurality of battery slots missing a battery, and to route the discharging current to all charging batteries and to all of the fully-charged batteries in series and to none of the plurality of battery slots missing a battery;

wherein the charging current and the discharging current flow at a same time, sharing at least some switches in the plurality of bypass switches and in the plurality of blocking switches;

wherein the charging current is routed to charging batteries and bypassed around fully-charged batteries while the discharging current is routed to charging batteries and fully-charged batteries;

a first battery in a first battery slot;

a second battery in a second battery slot;

wherein the intermediate node is between a negative terminal of the first battery and a positive terminal of the second battery;

wherein a positive terminal of the first battery is connected to the first discharging node;

wherein a negative terminal of the second battery is connected to the second discharging node, whereby the first battery and the second battery are connected in series between the first discharging node and the second discharging node;

wherein the plurality of blocking switches comprises:

a first switch coupled to conduct current between the first discharging node and the first charging node;

a fourth switch coupled to conduct current between the second charging node and the second discharging node;

wherein the plurality of bypass switches comprises:

a second switch coupled to conduct current between the first charging node and the intermediate node; and a third switch coupled to conduct current between the intermediate node and the second charging node;

whereby simultaneous charging and discharging currents flow serially through batteries.

10. The multiple battery charger of claim 9 wherein the microcontroller generates the switch configuration to open the first switch and prevent current flow between the first discharging node and the first charging node when the first battery is absent or is fully-charged;

wherein the microcontroller generates the switch configuration to open the fourth switch and prevent current flow between the second discharging node and the second charging node when the second battery is absent or fully-charged;

wherein the microcontroller generates the switch configuration to close the second switch and conduct current flow between the first charging node and the intermediate node when the second battery is charging and the first battery is absent or is fully-charged;

wherein the microcontroller generates the switch configuration to close the third switch and conduct current flow between the intermediate node and the second discharging node when the first battery is charging and the second battery is absent or fully-charged.

11. The multiple battery charger of claim 10 wherein the first switch, the second switch, the third switch, and the fourth switch each comprise a power metal-oxide-semiconductor field-effect transistor (MOSFET).

12. The multiple battery charger of claim 10 wherein the first switch, the second switch, the third switch, and the fourth switch each comprise an n-channel transistor having a gate controlled by a signal from the microcontroller.

\* \* \* \* \*